(12) United States Patent
Tung et al.

(10) Patent No.: US 8,395,536 B2
(45) Date of Patent: Mar. 12, 2013

(54) INPUT SYSTEM AND METHOD FOR ELECTRONIC DEVICE BASED ON CHINESE PHONETIC NOTATION

(75) Inventors: Yu-Chi Tung, Taipei (TW);
Hsun-Cheng Hu, Taipei County (TW);
Chung-Wen Liao, Taipei County (TW)

(73) Assignee: Institute for Information Industry, Taipei (TW)

( * ) Notice: Subject to any disclaimer, the term of this patent is extended or adjusted under 35 U.S.C. 154(b) by 655 days.

(21) Appl. No.: 12/607,987

(22) Filed: Oct. 28, 2009

(65) Prior Publication Data

US 2011/0068956 A1    Mar. 24, 2011

(30) Foreign Application Priority Data

Sep. 21, 2009    (TW) ................................ 98131784 A

(51) Int. Cl.
*H03M 11/00* (2006.01)
(52) U.S. Cl. .......................................... 341/28; 345/171
(58) Field of Classification Search .................... 341/28, 341/23; 345/171; 400/109
See application file for complete search history.

(56) References Cited

U.S. PATENT DOCUMENTS

| | | | | |
|---|---|---|---|---|
| 6,809,725 | B1 * | 10/2004 | Zhang | 345/171 |
| 7,315,982 | B2 * | 1/2008 | Becker | 715/262 |
| 7,711,541 | B2 * | 5/2010 | Sugano | 704/3 |
| 8,032,357 | B2 * | 10/2011 | Kung et al. | 704/5 |

FOREIGN PATENT DOCUMENTS

TW    200504530    2/2005

OTHER PUBLICATIONS

"Office Action of Taiwan Counterpart Application", issued on Oct. 25, 2012, p. 1-p. 10, in which the listed reference was cited.

* cited by examiner

*Primary Examiner* — Brian Young
(74) *Attorney, Agent, or Firm* — Jianq Chyun IP Office

(57) ABSTRACT

An input system and a method for an electronic device based on Chinese phonetic notation are provided. The input system includes a plurality of keys, a detecting unit, a filtering unit and a candidate character output unit. The keys are respectively arranged on two sides of a screen of the electronic device, and each of the keys respectively corresponding to two phonetic notation sets. Every time the detecting unit detects an operation on any of the keys, one of the phonetic notation sets corresponding to the operated key is chosen according to a direction of the operation. The filtering unit permutes the contents of all chosen phonetic notation sets so as to obtain at least one meaningful pronunciation. And according to a Chinese character database and the meaningful pronunciations, the candidate character output unit outputs at least one candidate character on the screen.

28 Claims, 4 Drawing Sheets

INPUT SYSTEM AND METHOD FOR ELECTRONIC DEVICE BASED ON CHINESE PHONETIC NOTATION

CROSS-REFERENCE TO RELATED APPLICATION

This application claims the priority benefit of Taiwan application serial no. 98131784, filed on Sep. 21, 2009. The entirety of the above-mentioned patent application is hereby incorporated by reference herein and made a part of specification.

BACKGROUND OF THE INVENTION

1. Field of the Invention

The present invention relates to an input system and an input method for an electronic device and more particularly, to a Chinese-phonetic-notation-based input system and a method thereof.

2. Description of Related Art

It is necessary for both of the computer systems and the consumptive electronic appliances to be equipped with the input devices for the user to input data or commands. In various types of input devices, the keyboard is widely used and is an input device with the highest acceptance rate. Each of the traditional physical keyboard and the virtual keyboard implemented by the software possesses a plurality keys which respectively correspond to different characters, so that, when the user presses one of the key, the character corresponding to the pressed key is input into the electronic device. As for the QWERTY keyboard, since the keys are one-on-one corresponding to the English alphabets, the number of the keys of the QWERTY keyboard is a lot. When the QWERTY keyboard is implemented as the virtual keyboard, huge amount of keys lead to inconvenient keyboard operation. For instance, it is inevitable to shrink down the dimension of the keyboard to avoid the screen space from being largely occupied by the virtual keyboard. Therefore, the displaying region allocating for each key is too small and the space between the keys is too narrow. Thus, it is highly possible for the user to mistakenly press the wrong key and the input efficiency cannot be improved. Furthermore, in order to solve the aforementioned problem, it is necessary to reasonably enlarge the displaying region of the virtual keyboard. When the virtual keyboard almost occupies half of the screen space, the operation frame viewed by the user is seriously affected.

Furthermore, in the operation of the Chinese based electronic device, the user is used to using the Chinese phonetic notation input method during the input operation. The major difference between inputting Chinese based on the Chinese phonetic notations and inputting English is that, while using the input method based on Chinese phonetic notations to input Chinese, the mapping relationship between the Chinese phonetic notations and the keys and the key arrangement directly affect the input efficiency. If the Chinese phonetic notations respectively correspond to the keys according to the order of the Chinese phonetic notations, it is easy to generate exceeding candidate characters during the input operation. Hence, the user needs to select a character from the candidate characters and the input efficiency is decreased.

SUMMARY OF THE INVENTION

Accordingly, the present invention provides an input system of an electronic device based on the Chinese phonetic notations capable of decreasing the number of the keys and increasing the input efficiency at the same time.

The present invention provides an input method of an electronic device based on the Chinese phonetic notations capable of improving the convenience of inputting Chinese.

The present invention provides an input system of an electronic device based on the Chinese phonetic notations and the input system includes a plurality of keys, a detecting unit, a filtering unit and a candidate character output unit. The keys are respectively arranged on a first side and a second side of a screen of the electronic device, and each of the keys corresponds to two phonetic notation sets. Moreover, each of the phonetic notation sets comprises a plurality of Chinese phonetic notations including one to two Chinese consonant notations and either one to two Chinese vowel notations or a Chinese medial notation. The detecting unit is coupled to the keys, and every time the detecting unit detects an operation on one of the keys, one of the phonetic notation sets corresponding to the operated key is chosen according to a direction of the operation. The filtering unit is coupled to the detecting unit for permuting all of the Chinese phonetic notations in the chosen phonetic notation sets to obtain at least one candidate meaningful pronunciation. The candidate character output unit is coupled to the filtering unit for outputting at least one candidate character onto the screen according to a Chinese character database and the at least one candidate meaningful pronunciation.

In one embodiment of the present invention, the keys are equally arranged on the first side and the second side of the screen. Further, the first side is one of the left-hand side and right-hand side of the screen, and the second side is the other one of the left-hand side and right-hand side of the screen.

In one embodiment of the present invention, the Chinese medial notations in the phonetic notation sets one-on-one correspond to the keys.

In one embodiment of the present invention, the Chinese consonant notation with a retroflex sound and the corresponding Chinese consonant notation with a non-retroflex sound are in the same phonetic notation set, and the Chinese vowel notation with a nasal sound and the corresponding Chinese vowel notation with a non-nasal sound are in the same phonetic notation set.

In one embodiment of the present invention, the Chinese phonetic notations in the phonetic notation sets are labeled on the keys according to a corresponding predetermined direction.

In one embodiment of the present invention, the detecting unit chooses one of the phonetic notation sets corresponding to the operated key, wherein the chosen phonetic notation set has the corresponding predetermined direction conforming to the direction of the operation.

In one embodiment of the present invention, the Chinese phonetic notations in the phonetic notation sets are labeled on different regions of the corresponding keys according to a notation classification. Moreover, the one to two Chinese consonant notations are labeled on an upper half portion of the corresponding key and the one to two Chinese vowel notations or the Chinese medial notation are labeled on a lower half portion of the corresponding key.

In one embodiment of the present invention, the filtering unit compares a permuting result of the Chinese phonetic notations in the chosen phonetic notation sets with a plurality of Chinese pronunciation information in a phonetic notation database to obtain the at least one candidate meaningful pronunciation.

In one embodiment of the present invention, the Chinese character database records a plurality of Chinese pronunciations and a plurality of Chinese characters. Each of the Chinese pronunciations corresponds to at least one of the Chinese characters. The candidate character output unit chooses one of the at least one candidate meaningful pronunciation according to a choosing signal, and obtains one of the Chinese pronunciations from the Chinese character database as same as the chosen candidate meaningful pronunciation, and determines at least a Chinese character corresponding to the obtained Chinese pronunciation to be the at least one candidate character.

In an embodiment of the present invention, the keys are either physical keys or virtual keys.

From another perspective, the present invention also provides an input method of an electronic device based on the Chinese phonetic notations. In the method, a plurality of keys are provided. The keys are respectively arranged on a first side and a second side of a screen of the electronic device, and each of the keys corresponds to two phonetic notation sets. Moreover, each of the phonetic notation sets comprises a plurality of Chinese phonetic notations including one to two Chinese consonant notations and either one to two Chinese vowel notations or a Chinese medial notation. Every time an operation on one of the keys is detected, one of the phonetic notation sets corresponding to the operated key is chosen according to a direction of the operation. Then, all of the Chinese phonetic notations in the chosen phonetic notation sets are permuted to obtain at least one candidate meaningful pronunciation. At least one candidate character is output onto the screen according to a Chinese character database and the at least one candidate meaningful pronunciation.

In one embodiment of the present invention, the keys are equally arranged on the first side and the second side of the screen, and the first side is one of the left-hand side and right-hand side of the screen, and the second side is the other one of the left-hand side and right-hand side of the screen.

In one embodiment of the present invention, the Chinese medial notations in the phonetic notation sets one-on-one correspond to the keys.

In one embodiment of the present invention, the Chinese consonant notation with a retroflex sound and the corresponding Chinese consonant notation with a non-retroflex sound are in the same phonetic notation set, and the Chinese vowel notation with a nasal sound and the corresponding Chinese vowel notation with a non-nasal sound are in the same phonetic notation set.

In one embodiment of the present invention, the Chinese phonetic notations in the phonetic notation sets are labeled on the keys according to a corresponding predetermined direction. The step of choosing one of the phonetic notation sets corresponding to the operated key according to the direction of the operation comprises choosing one of the phonetic notation sets corresponding to the operated key, wherein the chosen phonetic notation set has the corresponding predetermined direction conforming to the direction of the operation.

In one embodiment of the present invention, the Chinese phonetic notations in the phonetic notation sets are labeled on different regions of the corresponding keys according to a notation classification. Moreover, the one to two Chinese consonant notations are labeled on an upper half portion of the corresponding key and the one to two Chinese vowel notations or the Chinese medial notation are labeled on a lower half portion of the corresponding key.

The step of permuting all of the Chinese phonetic notations in the chosen phonetic notation sets to obtain the at least one candidate meaningful pronunciation comprises comparing a permuting result of the Chinese phonetic notations in the chosen phonetic notation sets with a plurality of Chinese pronunciation information in a phonetic notation database to obtain the at least one candidate meaningful pronunciation.

In one embodiment of the present invention, the Chinese character database records a plurality of Chinese pronunciations and a plurality of Chinese characters. Each of the Chinese pronunciations corresponds to at least one of the Chinese characters. The step of outputting the candidate characters onto the screen according to the Chinese character database and the at least one candidate meaningful pronunciation comprises choosing one of the candidate meaningful pronunciations according to a choosing signal. One of the Chinese pronunciations as same as the chosen candidate meaningful pronunciation is obtained from the Chinese character database. At least a Chinese character corresponding to the obtained Chinese pronunciation is determined to be the at least one candidate character.

In an embodiment of the present invention, the keys are either physical keys or virtual keys.

According to the above description, the present invention allocates the Chinese phonetic notations to different keys according to a specific rule so that each of the keys can correspond to two of the phonetic notation sets to decrease the number of the keys. Moreover, according to the operation of the user and the mapping relationship between the Chinese phonetic notations and the keys, the candidate characters can be effectively provided to the user. Therefore, the efficiency of the input based on the Chinese phonetic notations is improved and the operation convenience of the electronic device is increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The design of the keyboard and the key arrangement and the mapping relationship between the Chinese phonetic notations and the keys directly affect the input efficiency while the user of the electronic device uses the input method based on Chinese phonetic notations to input Chinese. Accordingly, the present invention provides an input system of the electronic device based on the Chinese phonetic notations and a method thereof. In order to make the present invention more comprehensible, embodiments are described below as examples to demonstrate that the present invention can actually be realized.

Figures 1, 2:
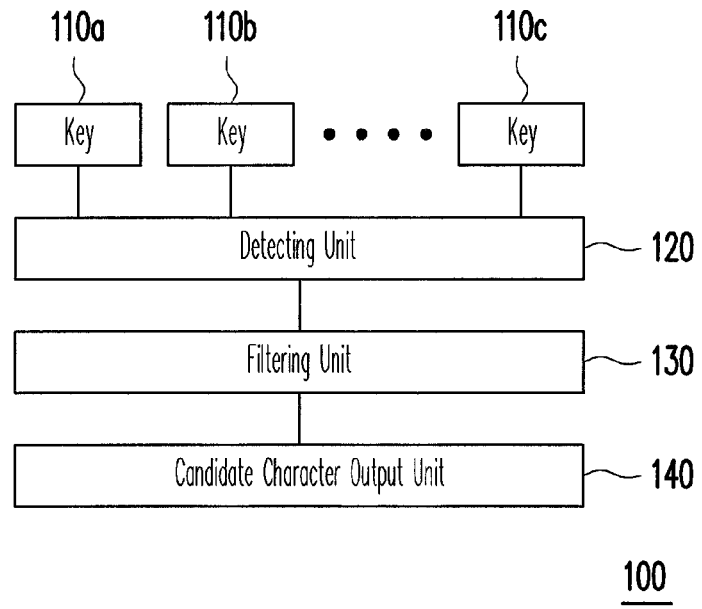
FIG. 1 is a block diagram illustrating an input system based on the Chinese phonetic notations.
FIG. 2 is a Chinese phonetic notation table showing the Chinese phonetic notations including the Chinese consonant notations, the Chinese vowel notations and the Chinese medial notations.

FIG. 1 is a block diagram illustrating an input system based on the Chinese phonetic notations. In the present embodiment, the Chinese-phonetic-notation-based input system 100 can be equipped with the portable phone, the personal digital assistant (PDA), the PDA phone, the smart phone and tablet personal computer (PC) and various terminal electronic devices supporting Chinese phonetic notation input method. It should be noticed that the present invention is not limited to the types of the electronic devices. As shown in FIG. 1, the Chinese-phonetic-notation-based input system 100 comprises a plurality of keys (e.g. key 110a, key 110b and key 110c), a detecting unit 120, a filtering unit 130 and a candidate character output unit 140.

It should be noticed that the keys in the Chinese-phonetic-notation-based input system 100 are equally arranged at the first side and the second side of the screen. More particularly, the keys in the Chinese-phonetic-notation-based input system 100 are equally arranged at both sides of the screen. Further, the first side is one of the left-hand side and right-hand side of the screen, and the second side is the other one of the left-hand side and right-hand side of the screen. In the present embodiment, each of the keys in the Chinese-phonetic-notation-based input system 100 corresponds two phonetic notation sets, and each of the phonetic notation sets comprises a plurality of Chinese phonetic notations including one to two Chinese consonant notations and either one to two Chinese vowel notations or a Chinese medial notation. In the other words, for each of the phonetic notation sets, the number of the Chinese consonant notations is no more than two and the number of the Chinese vowel notations is no more than two as well. It should be noticed that the aforementioned keys can be the physical keys or the virtual keys implemented by software and are not limited herein.

The detecting unit 120 is coupled to each of the keys in the Chinese-phonetic-notation-based input system 100. Furthermore, every time the detecting unit 120 detects an operation on one of the keys, one of the phonetic notation sets corresponding to the operated key is chosen according to a direction of the operation. That is, the detecting unit 120 continuously detects whether the keys are operated, and every time the detecting unit 120 detects an operation on one of the keys, one of the phonetic notation sets corresponding to the operated key is chosen according to a direction of the operation.

The filtering unit 130 is coupled to the detecting unit 120 for permuting all of the Chinese phonetic notations (such as the Chinese consonant notations, the Chinese vowel notations and the Chinese medial notations) in the chosen phonetic notation sets to further obtain at least one candidate meaningful pronunciation. The meaningful pronunciation means a pronunciation which can construct a Chinese character.

Since, in the Chinese language, it is common that a pronunciation relates to several characters, the candidate character outputting unit 140 connected to the filtering unit 130 obtains one or more candidate characters with the pronunciations conforming to the candidate meaningful pronunciation and the candidate characters are displayed on the screen for the user to choose.

As mentioned above, each of the keys in the Chinese-phonetic-notation-based input system 100 corresponds to two phonetic notation sets and the Chinese-phonetic-notation-based input system 100 can determine which one of the phonetic notation sets to be chosen according to the direction of the operation on the keys by the user. Therefore, the number of the keys is decreased and, meanwhile, the characters are provided to the user according to the operations on the keys by the user.

In the Chinese-phonetic-notation-based input system 100 of the aforementioned embodiment, the mapping relationship between the keys and the Chinese phonetic notations are set according to characteristics of the Chinese consonant notations, the Chinese vowel notations and the Chinese medial notations. In order to further explain the rules for mapping the Chinese phonetic notations to the keys, the Chinese phonetic notation table 200 shown in FIG. 2 is used to explain the notation classification of each of the Chinese phonetic notations. 37 Chinese phonetic notations can be classified into 21 Chinese consonant notations (including ㄅ, ㄆ, ㄇ, ㄈ, ㄉ, ㄊ, ㄋ, ㄌ, ㄍ, ㄎ, ㄏ, ㄐ, ㄑ, ㄒ, ㄓ, ㄔ, ㄕ, ㄖ, ㄗ, ㄘ, and ㄙ), 13 Chinese vowel notations (including ㄚ, ㄛ, ㄜ, ㄝ, ㄞ, ㄟ, ㄠ, ㄡ, ㄢ, ㄣ, ㄤ, ㄥ and ㄦ) and 3 Chinese medial notations (including ㄧ, ㄨ and ㄩ). In the present embodiment, when 37 Chinese phonetic notations are arranged to be related to the keys in the process of setting up the mapping relationship between the keys and the Chinese phonetic notations, the major rule to be followed is to allocate 3 Chinese medial notations onto different keys (i.e. the Chinese medial notations are respectively allocated onto three different keys in a one-on-one manner), and to group the corresponding Chinese consonant notations respectively with a retroflex sound and a non-retroflex sound (e.g. ㄓ and ㄗ are the corresponding Chinese consonant notations respectively with a retroflex sound and a non-retroflex sound, ㄔ and ㄘ are the corresponding Chinese consonant notations respectively with a retroflex sound and a non-retroflex sound and ㄕ and ㄙ are the corresponding Chinese consonant notations respectively with a retroflex sound and a non-retroflex sound) in the same phonetic notation set, and to group the corresponding Chinese vowel notation respectively with a nasal sound and a non-nasal sound (e.g. ㄥ and ㄣ are the corresponding Chinese vowel notation respectively with a nasal sound and a non-nasal sound) in the same phonetic notation set.

Figure 3:
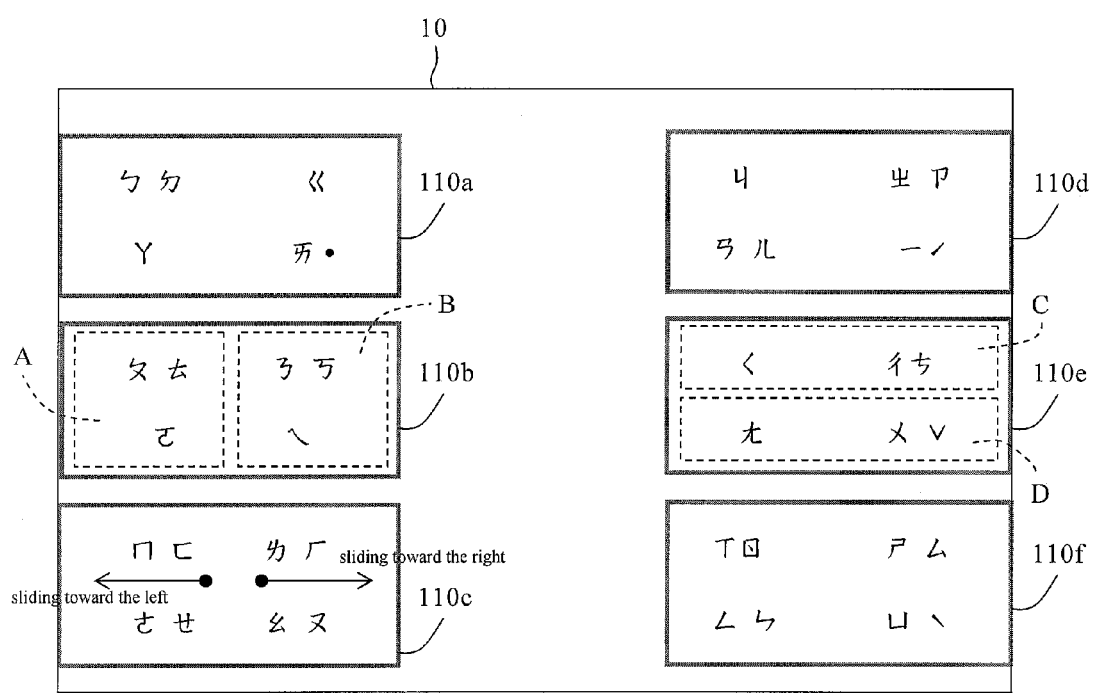
FIG. 3 is a schematic diagram showing a mapping relationship between the keys and the Chinese phonetic notations according to one embodiment of the present invention.

FIG. 3 is a schematic diagram showing a mapping relationship between the keys and the Chinese phonetic notations according to one embodiment of the present invention. As shown in FIG. 3, in the present embodiment, 37 phonetic notations and 4 tone marks (i.e. the second tone mark " ˊ ", the third tone mark "ˇ", the fourth tone mark " ˋ " and the neutral tone mark " ˙ ") are divided into 12 phonetic notation sets allocated to 6 virtual keys (i.e. keys 110a through 110f). The keys 110a through 110c are arranged at the left-hand side of the screen 10 of the electronic device and the keys 110d through 110f are arranged at the right-hand side of the screen 10 of the electronic device.

In the present embodiment, the Chinese medial notations ㄧ, ㄨ and ㄩ are respectively corresponding to keys 110d, 110e and 110f. It should be noticed that the mapping relationship between the aforementioned Chinese medial notations and the keys is only an exemplar of the present invention. As long as the Chinese medial notations respectively correspond to different keys, the arrangement of the Chinese phonetic notations on the keys is the claimed feature of the present invention.

As shown in FIG. 3, the Chinese consonant notation with the retroflex sound ㄓ and the corresponding Chinese consonant notation with the non-retroflex sound ㄗ are arranged in the same phonetic notation set and are corresponding to the key 110d. Moreover, the Chinese consonant notation with the retroflex sound ㄔ and the corresponding Chinese consonant notation with the non-retroflex sound ㄘ are arranged in the same phonetic notation set and are corresponding to the key 110e. Further, the Chinese consonant notation with the retroflex sound ㄕ and the corresponding Chinese consonant notation with the non-retroflex sound ㄙ are arranged in the same phonetic notation set and are corresponding to the key 110f. Further, the Chinese consonant notation with the nasal sound ㄥ and the corresponding Chinese consonant notation with the non-nasal sound ㄣ are arranged in the same phonetic notation set and are corresponding to the key 110f. It should be noted that the mapping relationships between the keys and the corresponding Chinese consonant notations respectively with the retroflex sound and non-retroflex sound and between the keys and the corresponding Chinese consonant notations respectively with the nasal sound and non-nasal sound are the exemplars of the present invention without further limiting the scope of the invention. As long as the corresponding Chinese consonant notations respectively with the retroflex sound and non-retroflex sound in the same phonetic notation set and the corresponding Chinese consonant notations respectively with the nasal sound and non-nasal sound in the same phonetic notation set, the arrangement of the Chinese phonetic notations on the keys is the claimed feature of the present invention.

Moreover, the Chinese phonetic notations in 12 phonetic notation sets are labeled on the keys 110a through 110f respectively according to the corresponding predetermined directions. For instance, the key 110b corresponds to a first phonetic notation set including the Chinese consonant notations ㄉ and ㄊ and the Chinese vowel notation ㄜ, and the key 110b corresponds to a second phonetic notation set including the Chinese consonant notations ㄋ and ㄌ and the Chinese vowel notation ㄟ. If the predetermined direction corresponding to the first phonetic notation set is left and the predetermined direction corresponding to the second phonetic notation set is right, the Chinese phonetic notations in the first phonetic notation set are labeled at the left half portion A of the key 110b and the Chinese phonetic notations in the second phonetic notation set are labeled at the right half portion B of the key 110b (as shown in FIG. 3).

Besides, the Chinese phonetic notations in each of the phonetic notation sets are labeled on different regions of the corresponding keys according to the notation classification. More clearly, in order to generate a visual effect simulating the phonetic rule of the Chinese phonetic notations, the Chinese consonant notations in each of the phonetic notation sets are labeled on an upper half portion of the corresponding key, and the Chinese vowel notations and the Chinese medial notations are labeled on a lower half portion of the corresponding key. For instance, the key 110e corresponds to the first phonetic notation set including the Chinese consonant notation ㄑ and the Chinese vowel notation ㄤ, and the key 110e corresponds to the second phonetic notation set including the Chinese consonant notations ㄐ and ㄒ and the Chinese medial notation ㄨ and the tone mark ˇ. Moreover, the Chinese consonant notations ㄑ, ㄐ and ㄒ are labeled on an upper half portion C of the corresponding key 110e and the Chinese vowel notation ㄤ and the Chinese medial notation ㄨ and the tone mark ˇ are labeled on a lower half portion D of the corresponding key 110e. Therefore, it is easy for the user to fine the keys while inputting Chinese with the Chinese phonetic notations.

In the present embodiment, the keys 110a through 110f are arranged at both sides of the screen 10 so that the user can directly input Chinese in a way that user's both hands hold two ends of the electronic device. Thus, the user can hold the electronic device in a relatively stable way and input the Chinese character at the same time. Furthermore, the number of the keys is decreased so that the operation frame of the screen 10 can be prevented from being over occupied by huge number of keys and the possible of mistakenly pressing the wrong key can be decreased.

It should be noticed that FIG. 3 is used to explain a kind of mapping relationship between the keys and the Chinese phonetic notations and the dimension ratio of the key to the screen is not limited thereto. Practically, since only six virtual keys are needed for being allocating all of the Chinese phonetic notations thereon, it is impossible that the virtual keys occupy over half of the display space of the screen. As for the physical keys, since the number of the keys is decreased, the spare space is enlarged for equipped with a relatively large screen for further improving the operation convenience.

Figure 4:
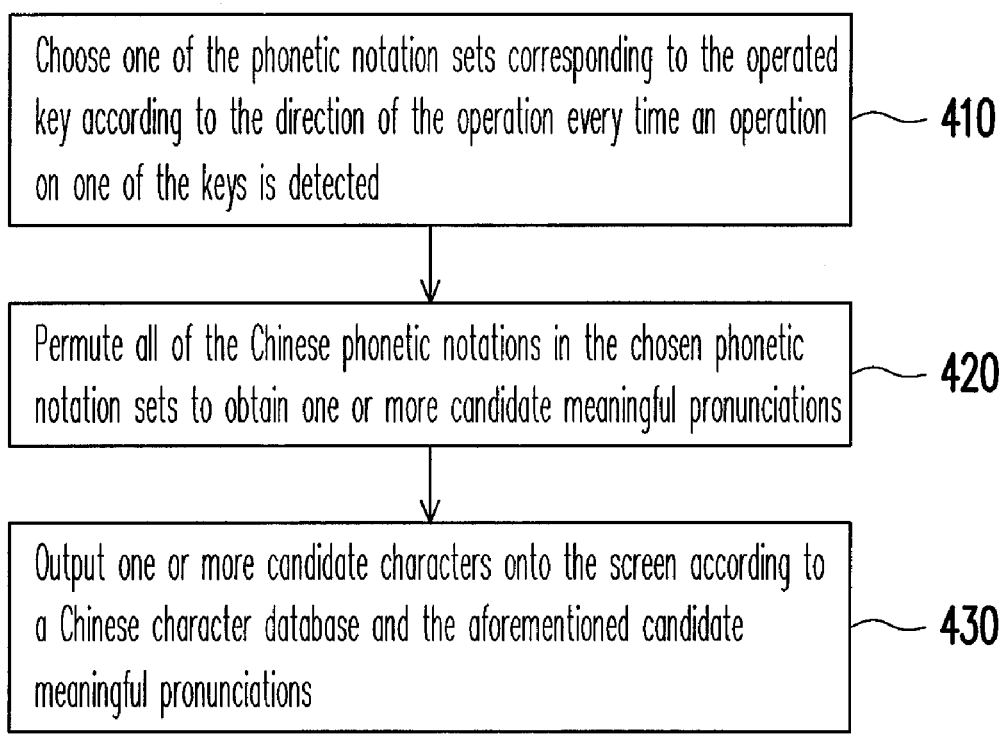
FIG. 4 is a flow chart illustrating an input method based on the Chinese phonetic notations.

In the following description, FIG. 4 is used to illustrate operation procedure of the Chinese-phonetic-notation-based input system 100. As shown in FIG. 1 together with FIG. 4, in the present embodiment, the keys in the Chinese-phonetic-notation-based input system 100 are equally arranged on each side of the screen of the electronic device. Also, each of the keys corresponds two phonetic notation sets, and each of the phonetic notation sets comprises a plurality of Chinese phonetic notations such as one to two Chinese consonant notations and either one to two Chinese vowel notations or a Chinese medial notation.

First, as shown in the step 410, every time the detecting unit 120 detects an operation on one of the keys, one of the phonetic notation sets corresponding to the operated key is chosen according to the direction of the operation. More clearly, since each of the phonetic notation sets corresponds to a predetermined direction (e.g. the direction toward the left and the right or toward the up and the down), after acknowledging the direction of the operation, the detecting unit 120 chooses one of the phonetic notation sets corresponding to the operated key and with the predetermined direction conforming the direction of the operation. Further, in the embodiment of FIG. 3, if the detecting unit 120 detects that the user touches key 110c with a sliding direction toward the right, the detecting unit 120 chooses the phonetic notation set having the Chinese consonant notations ㄅ and ㄈ, and the Chinese vowel notations ㄞ and ㄡ. Also, if the detecting unit 120 detects that the user touches key 110c with a sliding direction toward the left, the detecting unit 120 chooses the phonetic notation set having the Chinese consonant notations ㄇ and ㄏ, and the Chinese vowel notations ㄚ and ㄩ. That is, when the direction of the operation on each of the key is toward the left, the phonetic notation set on the left half portion of the operated key is chosen. Alternatively, when the direction of the operation on each of the key is toward the right, the phonetic notation set on the right half portion of the operated key is chosen.

Then, in the step 420, the filtering unit 130 permutes all of the Chinese phonetic notations in the chosen phonetic notation sets to obtain one or more candidate meaningful pronunciations. In the present embodiment, the filtering unit 130 permutes the Chinese phonetic notations according to the chosen order of the phonetic notation sets and determines whether there is at least one the candidate meaningful pronunciation by referring to the Chinese pronunciation information in a phonetic notation database (not shown). Moreover, the Chinese pronunciation information can, for example, include the permuting results of all the Chinese phonetic notations in each of the phonetic notation sets, wherein the permuting results generate meaningful pronunciations respectively. Therefore, the filtering unit 130 can search the content of the phonetic notation database to determine whether the permuting results of the Chinese phonetic notations in the chosen phonetic notation sets correspond to any meaningful pronunciation. If there is no meaningful pronunciation corresponding to the permuting result, the user cannot input Chinese character through the current operated keys. On the other hand, if there is at least one meaningful pronunciation corresponding to the permuting result, the meaningful pronunciation is regarded as the candidate meaningful pronunciation.

As shown in the step 430, the candidate character output unit 140 outputs one or more candidate character onto the screen according to a Chinese character database and the aforementioned candidate meaningful pronunciation. It should be noticed that the Chinese character database records a plurality of Chinese pronunciations and a plurality of Chinese characters. Each of the Chinese pronunciations corresponds to one or more of the Chinese characters. The candidate character output unit 140 can, for example, choose one of the candidate meaningful pronunciations according a choosing signal. Thereafter, the candidate character output unit 140 obtains one of the Chinese pronunciations from the Chinese character database, wherein the obtained Chinese pronunciation is as same as the chosen candidate meaningful pronunciation. Then, the candidate character output unit 140 determines at least one Chinese character corresponding to the obtained Chinese pronunciation to be the candidate character. In the present embodiment, the aforementioned choosing signal can be, for example, triggered by the touch movement on the screen or the press movement on the physical keys, and is not limited thereto.

Therefore, from the user's perspective, since the Chinese phonetic notations in each of the phonetic notation sets are labeled on the keys respectively according to the corresponding predetermined direction, the user can input the Chinese phonetic notations with the corresponding operation directions according to the labeled notations on each of the keys. Also, since the filtering unit 130 permutes the Chinese phonetic notations according to the chosen order of the phonetic notation sets in order to obtain the candidate meaningful pronunciation, no more than two Chinese consonant notations, two Chinese vowel notations or one Chinese medial notation are chosen in each key operation for the filtering unit 130 to permute. Thus, the number of the candidate meaningful pronunciations is decreased and the number of the candidate characters is decreased as well. Therefore, the input rate of the Chinese phonetic notations is increased.

Figure 5:
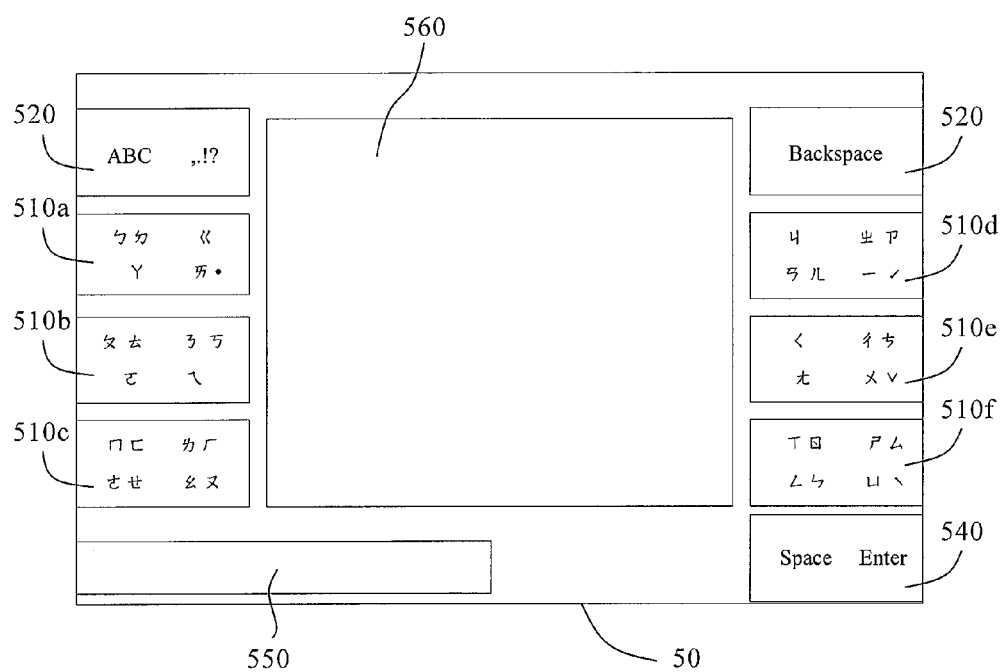
FIG. 5 is a schematic view of a screen of an electronic device according to one embodiment of the present invention.

FIG. 5 is a schematic view of a screen of an electronic device according to one embodiment of the present invention. In the present embodiment, 37 phonetic notations and 4 tone marks are divided into 12 phonetic notation sets equally allocated to 6 virtual keys (i.e. keys 510a through 510f). Keys 510a through 510f are configured at the left-hand side and the right-hand side of the screen 50 of the electronic device. The user can slide the finger toward the right or the left on the keys 510a through 510f to choose the phonetic notation sets. All of the candidate characters generated according to the chosen phonetic notation sets are displayed at the candidate character displaying region 550. After the user determines at least one of the candidate characters to be the input character, the determined character is input into the character inputting region 560.

In the present embodiment, the both sides of the screen 50 not only are arranged with the keys 501a through 510f but also arranged with a function key 520, a Backspace key 530, a Space/Enter key 540. When the user slides the finger toward the left on the function key 520, the input status of the electronic device can be switched. Furthermore, when the user slides the finger toward the right on the function key 520, the symbol table is turned on for the user to select the symbols. When the user touches the Backspace key 530, the previously input characters are deleted or the previously chosen phonetic notation set is deleted. Moreover, when the user slides the finger toward the left on the Space/Enter key 540, a space character is input. When the user slides the finger toward the right on the Space/Enter key 540, an inputting/choosing operation is confirmed or a line feed result is generated.

It should be noticed that, although the aforementioned embodiment illustrates the present invention by using the virtual keys, the keys in the Chinese-phonetic-notation-based input system of the present invention can be also implemented by the physical keys. Because the mapping relationship between the Chinese phonetic notations and the keys, the arrangements of the keys and the functions of the units of the Chinese-phonetic-notation-based input system are as same as or similar to those described in the previous embodiment while the keys of the Chinese-phonetic-notation-based input system are implemented by the physical keys, they are not further described herein.

According to the above description, the input system of the electronic device based on the Chinese phonetic notations and the input method of the present invention build up the mapping relationship between the Chinese phonetic notations and the keys to decrease the number of the keys so that the space of the screen for displaying the operation frame can be prevented from being occupied by the keys and the possibility of mistakenly pressing wrong keys can be decreased. Moreover, since the keys are configured at both sides of the screen of the electronic device, it is convenient for the user to hold the electronic device and to input the characters through the keys at both sides of the screen at the same time. Therefore, the operation convenience is increased.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An input system of an electronic device based on Chinese phonetic notations, the input system comprising:
   a plurality of keys respectively arranged on a first side and a second side of a screen of the electronic device, wherein each of the keys corresponds to two phonetic notation sets, and each of the phonetic notation sets comprises a plurality of Chinese phonetic notations including one to two Chinese consonant notations and either one to two Chinese vowel notations or a Chinese medial notation;
   a detecting unit coupled to the keys, wherein every time the detecting unit detects an operation on one of the keys, one of the phonetic notation sets corresponding to the operated key is chosen according to a direction of the operation;
   a filtering unit coupled to the detecting unit for permuting all of the Chinese phonetic notations in the chosen phonetic notation sets to obtain at least one candidate meaningful pronunciation; and
   a candidate character output unit coupled to the filtering unit for outputting at least one candidate character onto the screen according to a Chinese character database and the at least one candidate meaningful pronunciation.

2. The input system of claim 1, wherein the keys are equally arranged on the first side and the second side of the screen, and the first side is one of the left-hand side and right-hand side of the screen, and the second side is the other one of the left-hand side and right-hand side of the screen.

3. The input system of claim 1, wherein the Chinese medial notations in the phonetic notation sets one-on-one correspond to the keys.

4. The input system of claim 1, wherein the Chinese consonant notation with a retroflex sound and the corresponding Chinese consonant notation with a non-retroflex sound are in the same phonetic notation set.

5. The input system of claim 1, wherein the Chinese vowel notation with a nasal sound and the corresponding Chinese vowel notation with a non-nasal sound are in the same phonetic notation set.

6. The input system of claim 1, wherein the Chinese phonetic notations in the phonetic notation sets are labeled on the keys according to a corresponding predetermined direction.

7. The input system of claim 6, wherein the detecting unit chooses one of the phonetic notation sets corresponding to the operated key and the chosen phonetic notation set has the corresponding predetermined direction conforming to the direction of the operation.

8. The input system of claim 1, wherein the Chinese phonetic notations in the phonetic notation sets are labeled on different regions of the corresponding keys according to a notation classification.

9. The input system of claim 8, wherein the one to two Chinese consonant notations are labeled on an upper half portion of the corresponding key.

10. The input system of claim 8, wherein the one to two Chinese vowel notations or the Chinese medial notation are labeled on a lower half portion of the corresponding key.

11. The input system of claim 1, wherein the filtering unit compares a permuting result of the Chinese phonetic notations in the chosen phonetic notation sets with a plurality of Chinese pronunciation information in a phonetic notation database to obtain the at least one candidate meaningful pronunciation.

12. The input system of claim 1, wherein the Chinese character database records a plurality of Chinese pronunciations and a plurality of Chinese characters, each of the Chinese pronunciations corresponds to at least one of the Chinese characters.

13. The input system of claim 12, wherein the candidate character output unit chooses one of the at least one candidate meaningful pronunciation according to a choosing signal, and obtains one of the Chinese pronunciations from the Chinese character database as same as the chosen candidate meaningful pronunciation, and determines at least one of the Chinese characters corresponding to the obtained Chinese pronunciation to be the at least one candidate character.

14. The input system of claim 1, wherein the keys are either physical keys or virtual keys.

15. An input method of an electronic device based on Chinese phonetic notations, the input method comprising:
providing a plurality of keys, wherein the keys are respectively arranged on a first side and a second side of a screen of the electronic device, and each of the keys corresponds to two phonetic notation sets, and each of the phonetic notation sets comprises a plurality of Chinese phonetic notations including one to two Chinese consonant notations and either one to two Chinese vowel notations or a Chinese medial notation;
every time an operation on one of the keys is detected, choosing one of the phonetic notation sets corresponding to the operated key according to a direction of the operation;
permuting all of the Chinese phonetic notations in the chosen phonetic notation sets to obtain at least one candidate meaningful pronunciation; and
outputting at least one candidate character onto the screen according to a Chinese character database and the at least one candidate meaningful pronunciation.

16. The input method of claim 15, wherein the keys are equally arranged on the first side and the second side of the screen, and the first side is one of the left-hand side and right-hand side of the screen, and the second side is the other one of the left-hand side and right-hand side of the screen.

17. The input method of claim 15, wherein the Chinese medial notations in the phonetic notation sets one-on-one correspond to the keys.

18. The input method of claim 15, wherein the Chinese consonant notation with a retroflex sound and the corresponding Chinese consonant notation with a non-retroflex sound are in the same phonetic notation set.

19. The input method of claim 15, wherein the Chinese vowel notation with a nasal sound and the corresponding Chinese vowel notation with a non-nasal sound are in the same phonetic notation set.

20. The input method of claim 15, wherein the Chinese phonetic notations in the phonetic notation sets are labeled on the keys according to a corresponding predetermined direction.

21. The input method of claim 20, wherein the step of choosing one of the phonetic notation sets corresponding to the operated key according to the direction of the operation comprises:
choosing one of the phonetic notation sets corresponding to the operated key, wherein the chosen phonetic notation set has the corresponding predetermined direction conforming to the direction of the operation.

22. The input method of claim 15, wherein the Chinese phonetic notations in the phonetic notation sets are labeled on different regions of the corresponding keys according to a notation classification.

23. The input method of claim 22, wherein the one to two Chinese consonant notations are labeled on an upper half portion of the corresponding key.

24. The input method of claim 22, wherein the one to two Chinese vowel notations or the Chinese medial notation are labeled on a lower half portion of the corresponding key.

25. The input method of claim 15, wherein the step of permuting all of the Chinese phonetic notations in the chosen phonetic notation sets to obtain the at least one candidate meaningful pronunciation comprises:
comparing a permuting result of the Chinese phonetic notations in the chosen phonetic notation sets with a plurality of Chinese pronunciation information in a phonetic notation database to obtain the at least one candidate meaningful pronunciation.

26. The input method of claim 15, wherein the Chinese character database records a plurality of Chinese pronunciations and a plurality of Chinese characters, each of the Chinese pronunciations corresponds to at least one of the Chinese characters.

27. The input method of claim 26, wherein the step of outputting at least one candidate character onto the screen according to the Chinese character database and the at least one candidate meaningful pronunciation comprises:
choosing one of the at least one candidate meaningful pronunciation according to a choosing signal;
obtaining one of the Chinese pronunciations from the Chinese character database as same as the chosen candidate meaningful pronunciation; and
determining at least a Chinese character corresponding to the obtained Chinese pronunciation to be the at least one candidate character.

28. The input method of claim 15, wherein the keys are either physical keys or virtual keys.

* * * * *